(12) United States Patent
Seo et al.

(10) Patent No.: US 7,935,475 B2
(45) Date of Patent: May 3, 2011

(54) NEAR-INFRARED ABSORBING AND COLOR COMPENSATION FILM COMPOSITION FOR ELECTRONIC DEVICES

(75) Inventors: Hwi Min Seo, Gunpo-Si (KR); Soo Jeong Lee, Seoul (KR)

(73) Assignee: Cheil Industries, Inc., Gumi-shi, Gyungsangbuk-do (KR)

( * ) Notice: Subject to any disclaimer, the term of this patent is extended or adjusted under 35 U.S.C. 154(b) by 1030 days.

(21) Appl. No.: 11/438,807

(22) Filed: May 22, 2006

(65) Prior Publication Data

US 2007/0090331 A1    Apr. 26, 2007

(30) Foreign Application Priority Data

Oct. 26, 2005    (KR) .................. 10-2005-0101308

(51) Int. Cl.
*G11B 7/24*    (2006.01)
(52) U.S. Cl. ........... 430/270.21; 430/270.1; 430/270.18; 549/3
(58) Field of Classification Search ............... 430/270.1, 430/302
See application file for complete search history.

(56) References Cited

U.S. PATENT DOCUMENTS

| | | | | | |
|---|---|---|---|---|---|
| 5,574,715 | A | * | 11/1996 | Namba et al. | 369/288 |
| 6,071,672 | A | * | 6/2000 | Namba et al. | 430/270.18 |
| 6,168,843 | B1 | * | 1/2001 | Kambe et al. | 428/64.1 |
| 2002/0178517 | A1 | * | 12/2002 | Kasada et al. | 8/644 |
| 2003/0064322 | A1 | * | 4/2003 | Koyama et al. | 430/270.11 |
| 2003/0164105 | A1 | * | 9/2003 | Tashiro | 101/453 |
| 2004/0204555 | A1 | * | 10/2004 | Noda et al. | 526/242 |
| 2005/0040378 | A1 | | 2/2005 | Kobayashi et al. | |
| 2007/0277700 | A1 | * | 12/2007 | Wagenblast et al. | 106/31.45 |

FOREIGN PATENT DOCUMENTS

| | | |
|---|---|---|
| JP | 2-36996 | 2/1990 |
| JP | 6-200113 | 7/1994 |
| JP | 2000-250420 | 9/2000 |
| JP | 3621322 | 7/2001 |
| JP | 2002-205466 | 7/2002 |
| JP | 2002-311843 | 10/2002 |
| JP | 2002-350632 A | 12/2002 |
| JP | 2003-019865 | 1/2003 |
| JP | 2003-201452 A | 7/2003 |
| JP | 2003-221523 | 8/2003 |
| JP | 2003221523 A * | 8/2003 |
| JP | 2003-253245 A | 9/2003 |
| JP | 2003-292936 A | 10/2003 |
| JP | 2004-010816 A | 1/2004 |
| JP | 2004-182857 A | 7/2004 |
| JP | 2004-285314 | 10/2004 |
| JP | 2005-023104 A | 1/2005 |
| JP | 2005-62506 | 3/2005 |
| JP | 2005-154689 A | 6/2005 |
| KR | 10-2002-0055410 | 7/2002 |
| KR | 10-2004-0072993 | 8/2004 |
| KR | 10-2005-0007153 | 1/2005 |
| KR | 10-2005-0033971 | 4/2005 |
| WO | WO 03/032028 A1 | 4/2003 |
| WO | WO 2005/080453 A1 | 9/2005 |

* cited by examiner

*Primary Examiner* — Shean C Wu
*Assistant Examiner* — Chanceity N Robinson
(74) *Attorney, Agent, or Firm* — Lee & Morse, P.C.

(57) ABSTRACT

Disclosed herein are a near-infrared absorbing and color compensation film composition and a film using the film composition. The film composition comprises i) at least one colorant selected from the group consisting of an ionic compound of a near-infrared absorbing cyanine colorant cation having a maximum absorption wavelength in the range of 820 nm to 950 nm and a metal complex colorant anion, an ionic compound of a near-infrared absorbing diimmonium colorant cation having a maximum absorption wavelength in the range of 950 nm to 1,100 nm and a metal complex colorant anion, and an ionic compound of a selective visible light absorbing cyanine colorant cation having a maximum absorption wavelength in the range of 580 nm to 600 nm and a metal complex colorant anion, and ii) an adhesive; and a film using the film composition.

When the film composition is used to produce an adhesive film or an antireflective composite film, the price of raw materials used and the number of production steps can be reduced. Therefore, the film composition can be effectively applied to a front filter for a plasma display.

7 Claims, No Drawings

NEAR-INFRARED ABSORBING AND COLOR COMPENSATION FILM COMPOSITION FOR ELECTRONIC DEVICES

CROSS-REFERENCE TO RELATED APPLICATIONS

This application claims the benefit of Korean Patent Application No. 10-2005-0101308 filed on Oct. 26, 2005, the disclosure of which is incorporated herein by reference.

BACKGROUND OF THE INVENTION

1. Field of the Invention

The present invention relates to a near-infrared absorbing and color compensation film composition for use in displays, such as plasma displays.

2. Description of the Related Technology

Plasma displays are self-emissive displays, and have advantages of large display area and small thickness. Because of these advantages, plasma displays have been used for large-screen televisions. In plasma displays, discharge gases generate ultraviolet (UV) rays to excite phosphors to emit light. During operation, considerable amounts of near-infrared rays are emitted from the plasma display.

A wavelength range of the near-infrared region overlaps with a wavelength band around 930 nm which is employed in many remote controllers used for household electronic devices. Accordingly, near-infrared rays generated from a plasma display may cause malfunctions or undesired operation in household electric appliances. Further, near-infrared rays generated from plasma displays may affect certain wavelength ranges of around 850 nm which are employed in infrared data communication. Accordingly, filters capable of efficiently blocking near-infrared rays in the range of 820 nm to 1,000 nm may be needed to block unwanted near-infrared rays emitted from plasma displays.

On the other hand, the color purity of red light emitted from phosphors of plasma displays drops considerably due to strong light emission in the vicinity of 590 nm. Due to the presence of neon gas, which is a major constituent of penning gases for exciting phosphors, orange neon light is always emitted at about 585 nm, regardless of colors generated from the phosphors. Accordingly, color compensation filters capable of selectively absorbing light in the range of 580 nm to 600 nm may be needed to reduce the emission of orange neon light and obtain more natural colors.

In addition to near-infrared blocking filters and color compensation filters, electromagnetic wave shielding filters are necessary to efficiently block large amounts of electromagnetic waves generated from plasma displays. Furthermore, since external light is strongly reflected in plasma displays, unlike in liquid crystal displays (LCDs), plasma displays have a problem of a low contrast ratio when used in bright environment. To solve this problem, it may be necessary to form an antireflective layer on the front surface of a display.

A front filter is configured to have near-infrared blocking, electromagnetic wave shielding, color compensation and antireflective functions. Such a front filter is prepared by laminating functional coating films, an adhesive layer, a protective film and a release film sequentially on a base film.

The release film and the protective film are removed after the lamination is completed. If more than one function of the films can be integrated in a single film, the amount of the release film and the protective film would be reduced. The adhesive layer is used to laminate the respective films. If the number of necessary films is decreased, the amount of the adhesive material will also be reduced. In addition, if the multiple functions are integrated in a single film, the base film may be omitted.

In this connection, many have attempted to decrease the number of films used to manufacture a filter for plasma displays. Methods for incorporating functional layers, e.g., a near-infrared absorbing layer and a color compensation layer, into an adhesive coating layer have been suggested as particularly promising methods.

For example, Japanese Patent No. 3621322 discloses infrared-absorbing sheets using a composition which comprises an infrared ray absorber having a maximum absorption wavelength at 700-1,100 nm. Japanese Patent Laid-open No. 2002-311843 discloses an electromagnetic wave shielding material using a composition which comprises an adhesive and an absorber capable of absorbing visible light and/or near-infrared rays. Japanese Patent Laid-open No. 2005-62506 discloses an optical film using a composition which comprises an adhesive and a near-infrared absorbing colorant having a maximum absorption wavelength at 800-1,100 nm.

SUMMARY OF CERTAIN INVENTIVE ASPECTS

One aspect of the invention provides an electronic device. The electronic device comprises: a display for displaying visible light of an image; and a film placed in relation to the display such that at least part of the visible light passes therethrough, wherein the film comprises an ionic compound comprising a near infrared absorbing colorant cation and a metal complex anion represented by Formula 7:

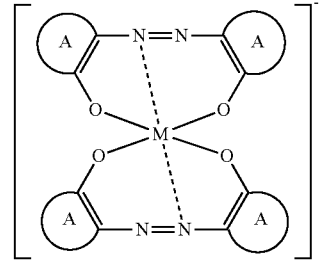

Formula 7

In the formula, M is a metal. Each A is independently a substituted or unsubstituted benzene ring, substituted or unsubstituted naphthalene ring, or substituted or unsubstituted anthracene ring, and the substituted ring is substituted with at least one substituent group selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro and ester.

In the device, the display may comprise a plasma display panel. The metal may be selected from the group consisting of Pd, Ni, Co and Cr. The metal complex anion may be further represented by Formula 10:

Formula 10

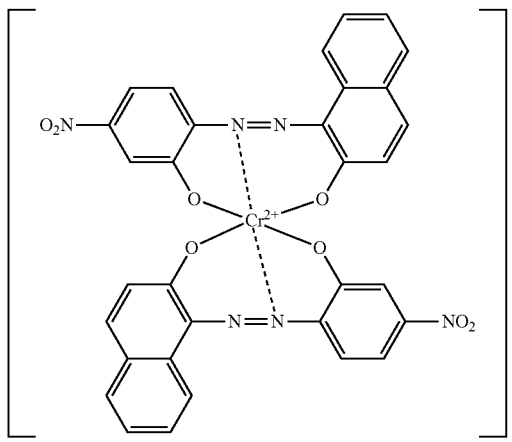

The film may further comprise another ionic compound which may comprise a near infrared absorbing colorant cation and a metal complex anion represented by Formula 5 or 6:

Formula 5

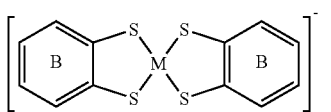

Formula 6

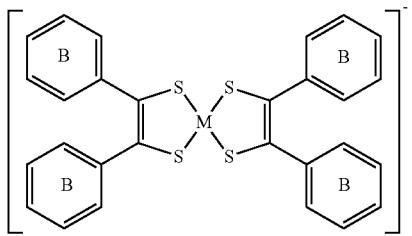

In the formulas, each B is independently a benzene ring which is unsubstituted or substituted with one to four substituent groups selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro, and ester. M is a metal atom selected from the group consisting of Pd, Ni, Co and Cu.

The near infrared absorbing colorant cation may comprise a cyanine colorant cation. The cyanine colorant cation may be represented by Formula 1:

Formula 1

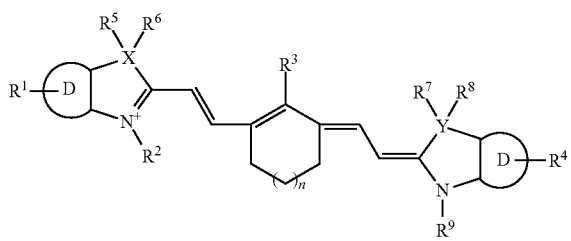

In the formula, each of $R^1$ and $R^4$ is independently hydrogen, halogen, nitro, cyano, $C_1$-$C_{16}$ alkoxy, $C_1$-$C_{16}$ alkyl, $C_1$-$C_{16}$ alkylalkoxy, or amino; each of $R^2$ and $R^9$ is independently hydrogen, $C_1$-$C_{16}$ alkyl, $C_1$-$C_{16}$ alkylalkoxy, or $C_1$-$C_{16}$ alkylsulfonic acid; $R^3$ is hydrogen, halogen, substituted phenyl, $C_1$-$C_{16}$ alkyl, or amino; each D is independently a benzene or naphthalene ring; each of X and Y is independently C, N, S or Se, provided that when both X and Y are C, each of $R^5$ and $R^6$ is independently hydrogen or $C_1$-$C_{16}$ alkyl, or $R^5$ and $R^6$ are bonded together to form an alkyl ring, and each of $R^7$ and $R^8$ is independently hydrogen or $C_1$-$C_{16}$ alkyl, or $R^7$ and $R^8$ are bonded together to form an alkyl ring, provided that when both X and Y are N, each of $R^5$ and $R^7$ is independently hydrogen or $C_1$-$C_{16}$ alkyl, and $R^6$ and $R^8$ represent no atom, and provided that when X and Y are S or Se, $R^5$, $R^6$, $R^7$ and $R^8$ represent no atom; and n is an integer between 0 and 2.

The near-infrared absorbing cyanine colorant cation may be represented by Formula 2:

Formula 2

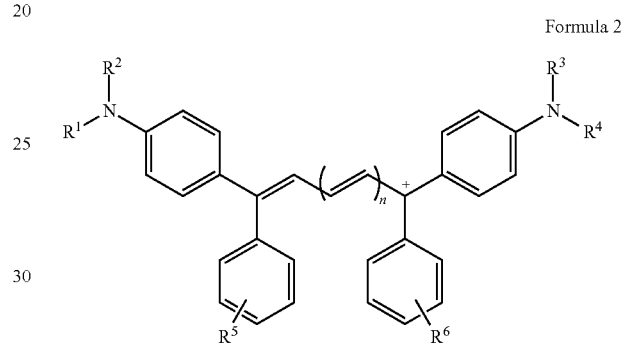

In the formula, each of $R^1$ and $R^2$ is independently hydrogen, $C_1$-$C_{16}$ alkyl, $C_1$-$C_{16}$ alkoxy, $C_1$-$C_{16}$ alkylalkoxy, or $R^1$ and $R^2$ are bonded together to form an alkyl ring; each of $R^3$ and $R^4$ is independently hydrogen, $C_1$-$C_{16}$ alkyl, $C_1$-$C_{16}$ alkoxy, $C_1$-$C_{16}$ alkylalkoxy, or $R^3$ and $R^4$ are bonded together to form an alkyl ring; each of $R^5$ and $R^6$ is independently hydrogen, halogen, nitro, cyano, $C_1$-$C_{16}$ alkoxy, $C_1$-$C_{16}$ alkyl, $C_1$-$C_{16}$ alkylalkoxy, or amino; and n is an integer between 0 and 3.

The near infrared absorbing colorant cation may comprise a diimmonium colorant cation. The near-infrared absorbing diimmonium colorant cation may be represented by Formula 3:

Formula 3

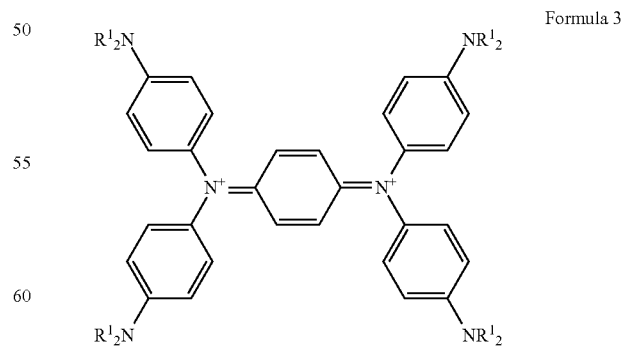

In the formula, $R^1$ is substituted or unsubstituted $C_1$-$C_{16}$ alkyl, substituted or unsubstituted $C_1$-$C_{16}$ alkenyl, substituted or unsubstituted $C_1$-$C_{16}$ alkynyl, or substituted or unsubstituted aryl.

The film may be adapted to absorb light with a wavelength between about 820 nm and about 1,100 nm. The device may further comprise another ionic compound comprising a visible light absorbing cyanine colorant cation and the metal complex anion. The visible light absorbing cyanine colorant cation is represented by Formula 4:

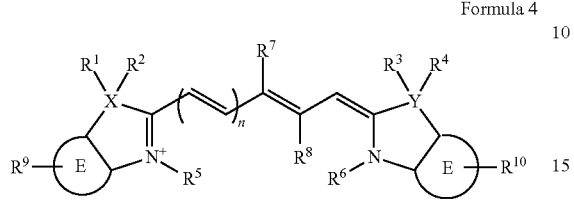

Formula 4

In the formula, each of R9 and R10 is independently hydrogen, halogen, nitro, cyano, $C_1$-$C_{16}$ alkoxy, $C_1$-$C_{16}$ alkyl, $C_{1-C16}$ alkylalkoxy, or amino; each of $R^5$ and $R^6$ is independently hydrogen, $C_1$-$C_{16}$ alkyl, $C_1$-$C_{16}$ alkylalkoxy, or $C_1$-$C_{16}$ alkylsulfonic acid; and n is 0 or 1; provided that when n is 0, $R^7$ is hydrogen and $R^8$ is hydrogen, halogen, substituted phenyl, $C_1$-$C_{16}$ alkyl, or amino, provided that when n is 1, $R^7$ is hydrogen or halogen, substituted phenyl, $C_1$-$C_{16}$ alkyl or amino and $R^8$ is hydrogen; each E is independently a benzene or naphthalene ring; and each of X and Y is each independently C, N, S or Se, provided that when both X and Y are C, each of $R^1$ and $R^2$ is independently hydrogen or $C_1$-$C_{16}$ alkyl, or $R^1$ and $R^2$ are bonded together to form an alkyl ring, and each of $R^3$ and $R^4$ is independently hydrogen or $C_1$-$C_{16}$ alkyl, or $R^3$ and $R^4$ are bonded together to form an alkyl ring, provided that when both X and Y are N, each of $R^1$ and $R^3$ is independently hydrogen or $C_1$-$C_{16}$ alkyl, and $R^2$ and $R^4$ represent no atom, and provided that when X and Y are S or Se, $R^1$, $R^2$, $R^3$ and $R^4$ represent no atom.

Another aspect of the invention provides a near-infrared absorbing composition for a plasma display device, comprising: an ionic compound comprising a near-infrared absorbing colorant cation and an azo-metal complex anion; and an adhesive.

In the composition, the azo-metal complex anion may be represented by Formula 7:

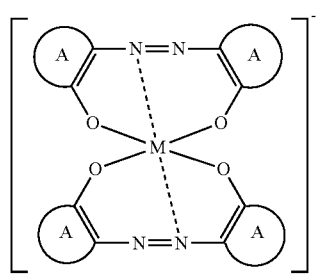

Formula 7

In the formula, M is a metal. Each A is independently a substituted or unsubstituted benzene ring, substituted or unsubstituted naphthalene ring, or substituted or unsubstituted anthracene ring, and the substituted ring is substituted with at least one substituent group selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro and ester.

The near-infrared absorbing colorant may be a cyanine colorant cation represented by Formula 1:

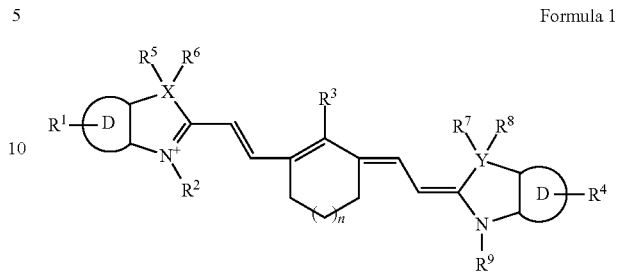

Formula 1

In the formula, each of $R^1$ and $R^4$ is independently hydrogen, halogen, nitro, cyano, $C_1$-$C_{16}$ alkoxy, $C_1$-$C_{16}$ alkyl, $C_1$-$C_{16}$ alkylalkoxy, or amino; each of $R^2$ and $R^9$ is independently hydrogen, $C_1$-$C_{16}$ alkyl, $C_1$-$C_{16}$ alkylalkoxy, or $C_1$-$C_{16}$ alkylsulfonic acid; $R^3$ is hydrogen, halogen, substituted phenyl, $C_1$-$C_{16}$ alkyl, or amino; each D is independently a benzene or naphthalene ring; each of X and Y is independently C, N, S or Se, provided that when both X and Y are C, each of $R^5$ and $R^6$ is independently hydrogen or $C_1$-$C_{16}$ alkyl, or $R^5$ and $R^6$ are bonded together to form an alkyl ring, and each of $R^7$ and $R^8$ is independently hydrogen or $C_1$-$C_{16}$ alkyl, or $R^7$ and $R^8$ are bonded together to form an alkyl ring, provided that when both X and Y are N, each of $R^5$ and $R^7$ is independently hydrogen or $C_1$-$C_{16}$ alkyl, and $R^6$ and $R^8$ represent no atom, and provided that when X and Y are S or Se, $R^5$, $R^6$, $R^7$ and $R^8$ represent no atom; and n is an integer between 0 and 2.

The near-infrared absorbing colorant may be a cyanine colorant cation represented by Formula 2:

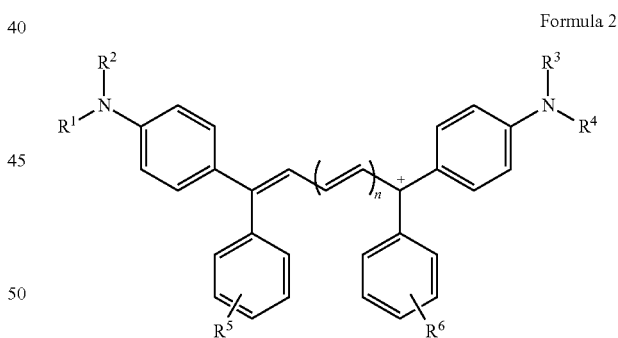

Formula 2

In the formula, each of $R^1$ and $R^2$ is independently hydrogen, $C_1$-$C_{16}$ alkyl, $C_1$-$C_{16}$ alkoxy, $C_1$-$C_{16}$ alkylalkoxy, or $R^1$ and $R^2$ are bonded together to form an alkyl ring; each of $R^3$ and $R^4$ is independently hydrogen, $C_1$-$C_{16}$ alkyl, $C_1$-$C_{16}$ alkoxy, $C_1$-$C_{16}$ alkylalkoxy, or $R^3$ and $R^4$ are bonded together to form an alkyl ring; each of $R^5$ and $R^6$ is independently hydrogen, halogen, nitro, cyano, $C_1$-$C_{16}$ alkoxy, $C_1$-$C_{16}$ alkyl, $C_1$-$C_{16}$ alkylalkoxy, or amino; and n is an integer between 0 and 3.

The composition may be adapted to absorb light with a wavelength between about 820 nm and about 1,100 nm. The near-infrared absorbing colorant cation may be a diimmonium colorant cation represented by Formula 3:

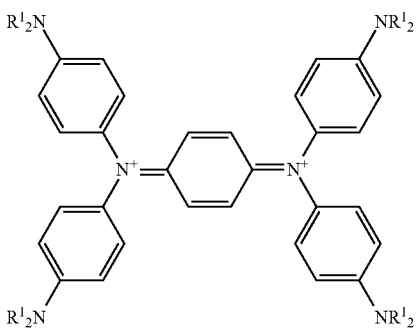

Formula 3

In the formula, $R^1$ is substituted or unsubstituted $C_1$-$C_{16}$ alkyl, substituted or unsubstituted $C_1$-$C_{16}$ alkenyl, substituted or unsubstituted $C_1$-$C_{16}$ alkynyl, or substituted or unsubstituted aryl.

The composition may further comprise another ionic compound comprising a visible light absorbing cyanine colorant cation and the azo-metal complex anion. The visible light absorbing cyanine colorant cation may be represented by Formula 4:

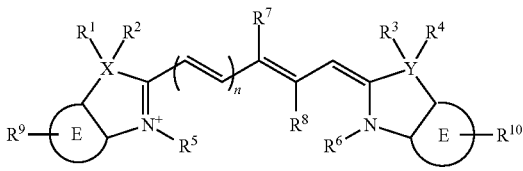

Formula 4

In the formula, each of R9 and R10 is independently hydrogen, halogen, nitro, cyano, $C_1$-$C_{16}$ alkoxy, $C_1$-$C_{16}$ alkyl, $C_1$-$C_{16}$ alkylalkoxy, or amino; each of $R^5$ and $R^6$ is independently hydrogen, $C_1$-$C_{16}$ alkyl, $C_1$-$C_{16}$ alkylalkoxy, or $C_1$-$C_{16}$ alkylsulfonic acid; and n is 0 or 1; provided that when n is 0, $R^7$ is hydrogen and $R^8$ is hydrogen, halogen, substituted phenyl, $C_1$-$C_{16}$ alkyl, or amino, provided that when n is 1, $R^7$ is hydrogen or halogen, substituted phenyl, $C_1$-$C_{16}$ alkyl or amino and $R^8$ is hydrogen; each E is independently a benzene or naphthalene ring; and each of X and Y is each independently C, N, S or Se, provided that when both X and Y are C, each of $R^1$ and $R^2$ is independently hydrogen or $C_1$-$C_{16}$ alkyl, or $R^1$ and $R^2$ are bonded together to form an alkyl ring, and each of $R^3$ and $R^4$ is independently hydrogen or $C_1$-$C_{16}$ alkyl, or $R^3$ and $R^4$ are bonded together to form an alkyl ring, provided that when both X and Y are N, each of $R^1$ and $R^3$ is independently hydrogen or $C_1$-$C_{16}$ alkyl, and $R^2$ and $R^4$ represent no atom, and provided that when X and Y are S or Se, $R^1$, $R^2$, $R^3$ and $R^4$ represent no atom.

Yet another aspect of the invention provides a near-infrared absorbing film comprising the composition described above.

Another aspect of the invention provides a method of making an electronic device. The method comprises: providing a display device for emitting visible light of an image; and placing the film described above in relation to the display device such that at least part of the visible light passes through the film.

Another aspect of the invention provides a method of absorbing or reducing emission of light having certain wavelength from a display. The method comprises: providing an electronic device described above; stimulating the electronic device to emit light rays from the display, thereby displaying an image on the display surface; and absorbing at least part of the light rays in the film.

Another aspect of the invention provides a film for use in a front filter for a plasma display wherein the film is produced by preparing a salt of a cyanine or diimmonium colorant and a metal complex without causing a change in the absorbance characteristics of the colorants, mixing the salt with an adhesive, and producing an adhesive film or an antireflective composite film using the mixture, thereby reducing the price of raw materials used and the number of production steps.

Yet another aspect of the invention provides a near-infrared absorbing and color compensation film composition comprising i) at least one colorant selected from the group consisting of an ionic compound of a near-infrared absorbing cyanine colorant cation having a maximum absorption wavelength in the range of 820 nm to 950 nm and a metal complex colorant anion, an ionic compound of a near-infrared absorbing diimmonium colorant cation having a maximum absorption wavelength in the range of 950 nm to 1,100 nm and a metal complex colorant anion, and an ionic compound of a selective visible light absorbing cyanine colorant cation having a maximum absorption wavelength in the range of 580 nm to 600 nm and a metal complex colorant anion, and ii) an adhesive.

Another aspect of the invention provides a film produced using the composition described above.

DETAILED DESCRIPTION OF CERTAIN INVENTIVE EMBODIMENTS

Various aspects and features of the invention will become more fully apparent from the following description.

Near-infrared absorbing colorants include anthraquinone, phthalocyanine, cyanine, dithiol-metal complex, and diimmonium colorants. Among these colorants, anthraquinone and dithiol-metal complex colorants do not react with functional groups of adhesives. However, due to their very low absorbance, they must be used in amounts sufficient to block near-infrared rays. Use of large amounts of the colorants leads to a marked drop in visible light transmittance, and thus these colorants are unsuitable for use as near-infrared absorbing colorants.

Further, phthalocyanine colorants are the most potent colorants that can be mixed with adhesives. Phthalocyanine colorants have a high absorbance and are not decomposed by functional groups of adhesives. However, since phthalocyanine colorants have a narrow absorption range, they must be used with other colorants having different absorption wavelength bands in order to absorb light, in a broad range of wavelengths. In addition, the use of large amounts of the colorants increases costs and causes low visible light transmittance. On the other hand, diimmonium colorants can absorb near-infrared rays in a broad range of wavelengths and have a low absorbance in the visible region. Therefore, they are widely used as materials for near-infrared absorbing filters for plasma displays.

Diimmonium colorants have a maximum absorption wavelength in the range of 950 nm to 1,100 nm. They, however, cannot efficiently block light with wavelengths around 850 nm. To overcome the problem, other colorants such as near-infrared blocking phthalocyanine and/or cyanine colorants may need to be additionally used. The phthalocyanine and/or cyanine colorants are known to absorb light of a narrow wavelength band and have a high absorbance. Since near-infrared cyanine colorants have a higher absorbance than phthalocyanine colorants, they can be used in a smaller amount, which is economically advantageous. Advantageously, cyanine colorants have a low absorbance in the visible region. However, cyanine colorants react undesirably with functional groups of adhesives, making mixing it with adhesives difficult.

In addition, as colorants for color compensation, cyanine and tetraazaporphyrin colorants can be used. Cyanine colorants react undesirably with adhesives, which makes mixing it with adhesives very difficult. On the other hand, tetraazaporphyrin colorants do not react with adhesives.

Although cyanine colorants have a higher absorbance and a lower visible light absorptivity than tetraazaporphyrin and phthalocyanine colorants, they have poor durability against functional groups of adhesives. Thus, there is a need to overcome the poor durability.

In one embodiment, an electronic device includes a display such as a plasma display panel. The display has a display surface which is configured to display a visible image. The electronic device further includes a film covering at least part of the display surface. The film is formed of a film composition which will be described below.

The film composition may include i) one or more materials selected from the group consisting of an ionic compound of a near-infrared absorbing cyanine colorant cation having a maximum absorption wavelength in the range of 820 nm to 950 nm and a metal complex colorant anion, an ionic compound of a near-infrared absorbing diimmonium colorant cation having a maximum absorption wavelength in the range of 950 nm to 1,100 nm and a metal complex colorant anion, and an ionic compound of a selective visible light absorbing cyanine colorant cation having a maximum absorption wavelength in the range of 580 nm to 600 nm and a metal complex colorant anion, and ii) an adhesive.

The term, "ionic compound," as used herein, refers to a compound which has at least two charged moieties that are ionically boned together. In one embodiment, the ionic compound includes a colorant cation and a metal complex anion.

In one embodiment, the film composition includes an ionic compound having a near-infrared absorbing cyanine colorant cation having a maximum absorption wavelength in the range of 820 nm to 950 nm. The near-infrared absorbing cyanine colorant cation may be represented by Formulae 1 and 2 below:

Formula 1

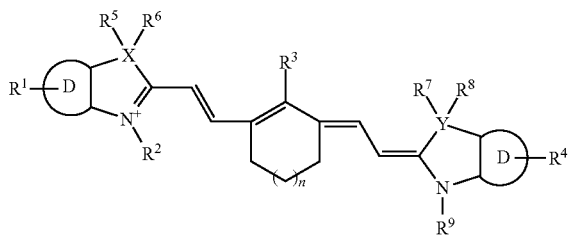

In Formula 1, each of $R^1$ and $R^4$ is independently hydrogen, halogen, nitro, cyano, $C_1$-$C_{16}$ alkoxy, $C_1$-$C_{16}$ alkyl, $C_1$-$C_{16}$ alkylalkoxy, or amino. Each of $R^2$ and $R^9$ is independently hydrogen, $C_1$-$C_{16}$ alkyl, $C_1$-$C_{16}$ alkylalkoxy, or $C_1$-$C_{16}$ alkylsulfonic acid. $R^3$ is hydrogen, halogen, substituted phenyl, $C_1$-$C_{16}$ alkyl, or amino. Each D is independently a benzene or naphthalene ring. Each of X and Y is independently C, N, S or Se, provided that when both X and Y are C, each of $R^5$ and $R^6$ is independently hydrogen or $C_1$-$C_{16}$ alkyl, or $R^5$ and $R^6$ are bonded together to form an alkyl ring, and each of $R^7$ and $R^8$ is independently hydrogen or $C_1$-$C_{16}$ alkyl, or $R^7$ and $R^8$ are bonded together to form an alkyl ring, provided that when both X and Y are N, each of $R^5$ and $R^7$ is independently hydrogen or $C_1$-$C_{16}$ alkyl, and $R^6$ and $R^8$ represent no atom, and provided that when X and Y are S or Se, $R^5$, $R^6$, $R^7$ and $R^8$ represent no atom. n is an integer between 0 and 2.

Formula 2

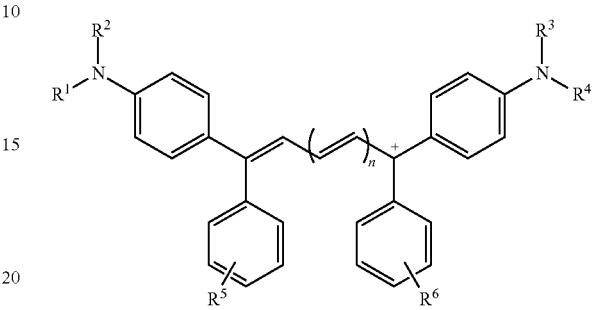

In Formula 2, each of $R^1$ and $R^2$ is independently hydrogen, $C_1$-$C_{16}$ alkyl, $C_1$-$C_{16}$ alkoxy, $C_1$-$C_{16}$ alkylalkoxy, or $R^1$ and $R^2$ are bonded together to form an alkyl ring. Each of $R^3$ and $R^4$ is independently hydrogen, $C_1$-$C_{16}$ alkyl, $C_1$-$C_{16}$ alkoxy, $C_1$-$C_{16}$ alkylalkoxy, or $R^3$ and $R^4$ are bonded together to form an alkyl ring. Each of $R^5$ and $R^6$ is independently hydrogen, halogen, nitro, cyano, $C_1$-$C_{16}$ alkoxy, $C_1$-$C_{16}$ alkyl, $C_1$-$C_{16}$ alkylalkoxy, or amino. n is an integer between 0 and 3.

Such near-infrared absorbing cyanine colorants are commercially available under trademarks, for example, TZ-115 (Asahi Denka), NK-7916 (Hayashibara biochemical), PDC-400 (Nippon Kayaku) and PD-301 (Yamada Chemical). These commercially available colorant cations are typically ionically bonded to halogen anions, $ClO_4^-$, $PF_6^-$, $SbF_6^-$, $BF_4^-$, or toluene sulfonate anions.

In another embodiment, the composition includes a near-infrared absorbing diimmonium colorant cation having a maximum absorption wavelength in the range of 950 nm to 1,100 nm. In certain embodiments, the composition may include both the cyanine and diimmonium colorants. The near-infrared absorbing diimmonium colorant cations can be represented by Formula 3 below:

Formula 3

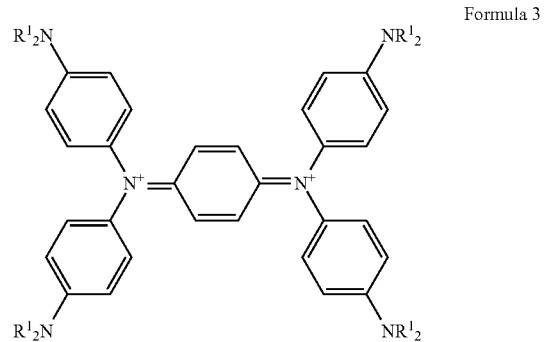

In Formula 3, $R^1$ is substituted or unsubstituted $C_1$-$C_{16}$ alkyl, substituted or unsubstituted $C_1$-$C_{16}$ alkenyl, substituted or unsubstituted $C_1$-$C_{16}$ alkynyl, or substituted or unsubstituted aryl. The substituted aryl may be substituted with halogen, nitro, cyano, $C_1$-$C_{16}$ alkoxy, $C_1$-$C_{16}$ alkyl, $C_1$-$C_{16}$ alkylalkoxy, or amino.

Such diimmonium colorants are commercially available under the trademarks, for example, PDC-220 (Nippon Kayaku) and CIR-1085 (Japan Carlit), but are not limited thereto. These commercially available diimmonium colorant cations are typically ionically bonded to halogen anions, $ClO_4^-$, $PF_6^-$, $SbF_6^-$, $BF_4^-$, or toluene sulfonate anions.

In another embodiment, the composition may further include a visible light absorbing colorant cation having a maximum absorption wavelength in the range of 580 nm to 600 nm. The visible light absorbing cyanine colorant cation may be represented by Formula 4 below:

Formula 4

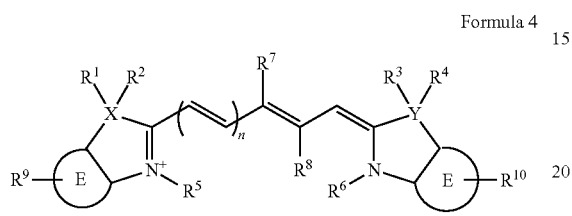

In Formula 4, each of $R^9$ and $R^{10}$ is independently hydrogen, halogen, nitro, cyano, $C_1$-$C_{16}$ alkoxy, $C_1$-$C_{16}$ alkyl, $C_1$-$C_{16}$ alkylalkoxy, or amino. Each of $R^5$ and $R^6$ is independently hydrogen, $C_1$-$C_{16}$ alkyl, $C_1$-$C_{16}$ alkylalkoxy, or $C_1$-$C_{16}$ alkylsulfonic acid. n is 0 or 1, provided that when n is 0, $R^7$ is hydrogen and $R^8$ is hydrogen, halogen, substituted phenyl, $C_1$-$C_{16}$ alkyl, or amino, provided that when n is 1, $R^7$ is hydrogen or halogen, substituted phenyl, $C_1$-$C_{16}$ alkyl or amino and $R^8$ is hydrogen. Each E is independently a benzene or naphthalene ring. Each of X and Y is each independently C, N, S or Se, provided that when both X and Y are C, each of $R^1$ and $R^2$ is independently hydrogen or $C_1$-$C_{16}$ alkyl, or $R^1$ and $R^2$ are bonded together to form an alkyl ring, and each of $R^3$ and $R^4$ is independently hydrogen or $C_1$-$C_{16}$ alkyl, or $R^3$ and $R^4$ are bonded together to form an alkyl ring, provided that when both X and Y are N, each of $R^1$ and $R^3$ is independently hydrogen or $C_1$-$C_{16}$ alkyl, and $R^2$ and $R^4$ represent no atom, and provided that when X and Y are S or Se, $R^1$, $R^2$, $R^3$ and $R^4$ represent no atom. Such a visible light absorbing colorants is commercially available under a trademark for example, TY-102 (Asahi Denka).

In one embodiment, the ionic compound of the composition includes as a metal complex anion selected from dithiol-metal complex anions represented by Formulae 5 and 6 below, and azo-metal complex anions represented by Formula 7 below. The metal complex anions may exist in either cis or trans form.

Formula 5

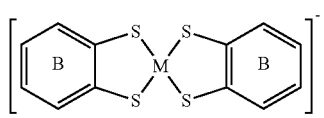

In Formula 5, each B is independently a benzene ring which is unsubstituted or substituted with one to four substituent groups selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro, and ester. M is a metal atom selected from the group consisting of Pd, Ni, Co and Cu. The substituted sulfonyl may be substituted with $C_1$-$C_{16}$ alkyl, $C_1$-$C_{16}$ alkoxy, $C_1$-$C_{16}$ alkylalkoxy or substituted aryl which is substituted with hydrogen, halogen, nitro, cyano, $C_1$-$C_{16}$ alkoxy, $C_1$-$C_{16}$ alkyl, $C_1$-$C_{16}$ alkylalkoxy.

The dithiol-metal complex colorants of Formula 5 are commercially available under trademarks, for example, EST-5 (Sumitomo Seika) and BBT (Sumitomo Seika). The commercially available metal complex anions are typically bonded to hydrogen cations, tetraalkylammonium cations, tetraalkyl/tetraphenyl phosphonium cations.

Formula 6

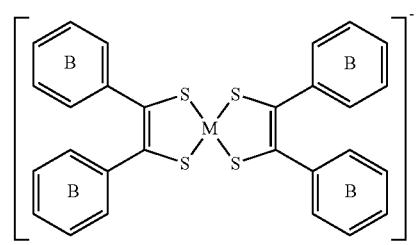

In Formula 6, each B is independently a benzene ring which is unsubstituted or substituted with one to four substituent groups selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro, and ester. M is a metal atom selected from the group consisting of Pd, Ni, Co and Cu. The substituted sulfonyl may be substituted with $C_1$-$C_{16}$ alkyl, $C_1$-$C_{16}$ alkoxy, $C_1$-$C_{16}$ alkylalkoxy or substituted aryl which is substituted with hydrogen, halogen, nitro, cyano, $C_1$-$C_{16}$ alkoxy, $C_1$-$C_{16}$ alkyl, $C_1$-$C_{16}$ alkylalkoxy.

The metal complex anions may exist in either cis or trans form. The dithiol-metal complex colorants of Formula 6 may be prepared by reducing a commercially available compound such as NKX-1199 (Hayashibara biochemical).

Formula 7

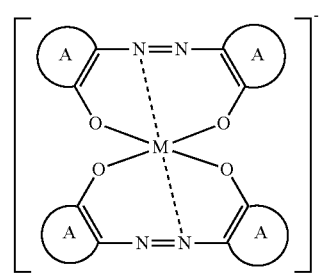

In Formula 7, M is a metal. Each A is independently a substituted or unsubstituted benzene ring, substituted or unsubstituted naphthalene ring, or substituted or unsubstituted anthracene ring. The substituted ring is substituted with at least one substituent group selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro and ester. The colorants of Formula 7 are commercially available under a trademark, form example, Lumaplast Black-KB (M-Dohmen). The substituted sulfonyl may be substituted with $C_1$-$C_{16}$ alkyl, $C_1$-$C_{16}$ alkoxy, $C_1$-$C_{16}$ alkylalkoxy or substituted aryl which is substituted with hydrogen, halogen, nitro, cyano, $C_1$-$C_{16}$ alkoxy, $C_1$-$C_{16}$ alkyl, $C_1$-$C_{16}$ alkylalkoxy.

In one embodiment, the ionic compounds of the composition may be prepared by a reaction between one of the above colorant cations represented by Formulae 1 to 4 and one of the colorant anions represented by Formulae 5 to 7. The reaction can be represented by the following Reaction 1 or 2:

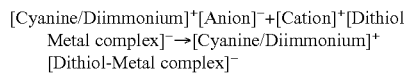
[Cyanine/Diimmonium]⁺[Anion]⁻+[Cation]⁺[Dithiol-Metal complex]⁻→[Cyanine/Diimmonium]⁺[Dithiol-Metal complex]⁻   Reaction 1

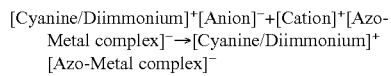
[Cyanine/Diimmonium]⁺[Anion]⁻+[Cation]⁺[Azo-Metal complex]⁻→[Cyanine/Diimmonium]⁺[Azo-Metal complex]⁻   Reaction 2

As shown in Reaction 1, the cyanine or diimmonium colorant represented by one of Formulae 1 to 4 which are ionically bonded to an anion, is mixed with the dithiol-metal complex colorant represented by Formula 5 or 6, which are ionically bonded to a cation. Examples of the anion include halogen anions, $ClO_4^-$, $PF_6^-$, $SbF_6^-$, $BF_4^-$, or toluene sulfonate anions. Examples of the cation include hydrogen cations, tetraalkylammonium cations, tetraalkyl/tetraphenyl phosphonium cations.

Then, the mixture is subjected to an ion-exchange reaction while heating. During this reaction, the anion which is a counter ion of the cyanine colorant or diimmonium colorant cation, becomes bonded to the cation which is a counter ion of the dithiol-metal complex anion. This is caused by a strong binding energy between the ions to form an ionic compound. The remaining cyanine or diimmonium colorant cation is bonded to the remaining dithiol-metal complex anion, resulting in a desired colorant ionic compound.

Since the anion which is a counter ion of the cyanine colorant or diimmonium colorant cation, and the cation which is a counter ion of the dithiol-metal complex anion, are highly soluble in polar solvents, they are dissolved in water. In contrast, the ionic compound of the cyanine colorant or diimmonium colorant cation and the dithiol-metal complex is highly soluble in organic solvents. Accordingly, this solubility difference allows separation of the colorant ionic compound from the counter ions.

As shown in Reaction 2, the cyanine or diimmonium colorant is reacted with the azo-metal complex colorant to prepare the desired [cyanine/diimmonium]⁺[azo-metal complex]⁻ colorant. In the case where the cation of the azo-metal complex colorant is a hydrogen ion, triethylamine may be added to promote the ion-exchange reaction. The triethylamine bonds with the hydrogen cation to form an ammonium cation, which allows the ion-exchange reaction to rapidly proceed. In one embodiment, the ionic compound colorants are used in amounts of about 0.01 to about 1% by weight, based on the total weight of the film composition. For example, the amounts may include 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00% by weight.

In one embodiment, among the dithiol-metal complex anions represented by Formula 5, an ionic compound includes a dithiol-metal complex anion represented by Formula 8 below:

Formula 8

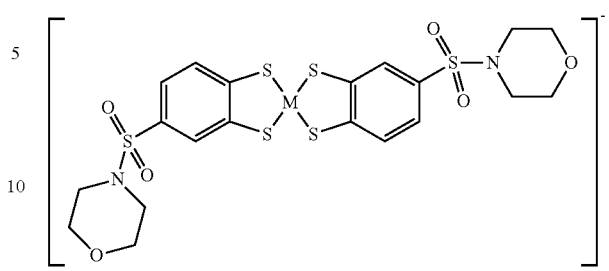

Here M represents a metal. The metal M may be, for example, Cu, Co or Ni.

The maximum absorption wavelength and absorbance of the anion of Formula 8 vary depending on the kind of the central metal. An anion whose central metal is copper exhibits a maximum absorbance around 400 nm in the visible region and thus it absorbs light in the blue light region. The absorbance coefficient of the anion is much lower than that of the cyanine colorant cations, which are counter ions of the anion. Thus, the anion can be used in an amount sufficient to absorb near-infrared rays or light with a wavelength between 580 nm and 600 nm without adversely affecting the entire visible light transmittance.

Since an anion whose central metal is nickel (Ni) exhibits a maximum absorbance around 380 nm and 850 nm, it has less influence on the visible light transmittance than the anion having copper (Cu) as the central metal. In addition, an anion having Ni as the central metal absorbs near-infrared rays. Accordingly, in one embodiment, the anion having Ni as the central metal may be used to absorb near-infrared rays. The anion having Cu as the central metal may be used in terms of cost saving.

In one embodiment, among the dithiol-metal complex anions represented by Formula 6, an ionic compound includes an anion represented by Formula 9 below:

Formula 9

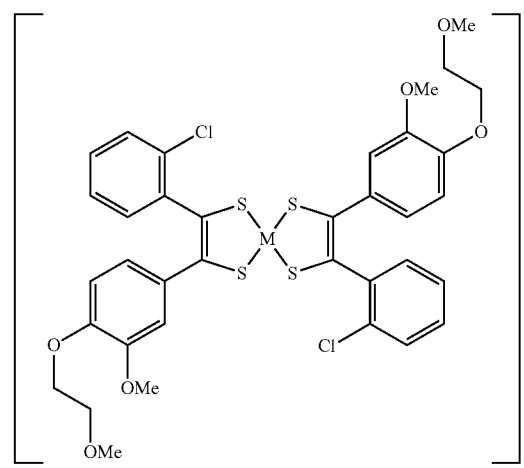

An anion whose central metal is nickel exhibits a maximum absorbance around 930 nm, which overlaps with the wavelength bands of near-infrared rays employed in remote controller. Accordingly, when the anion forms an ionic compound with a cyanine colorant cation having a maximum absorbance around 930 nm, the near-infrared absorption ability is increased. Thus, the composition has sufficient near-infrared absorption ability to prevent malfunction of remote controllers despite the use of a reduced amount of the ionic compound colorant.

In one embodiment, among the anions represented by Formula 7, an ionic compound includes an anion represented by Formula 10 below:

Formula 10

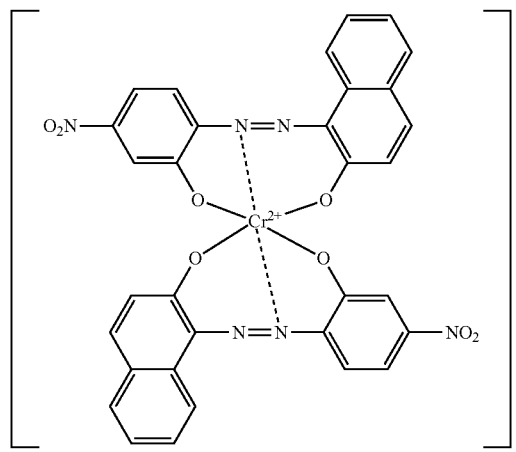

The colorants are used as materials for a near-infrared blocking and color compensation adhesive coating solution. When a front filter uses a copper mesh film as an electromagnetic wave shielding material, the coating solution must include a selective visible light absorbing colorant having a maximum absorbance at 580 to 600 nm and a small full-width at half-maximum (FWHM), a near-infrared absorbing colorant, and a transmittance-controlling colorant for adjusting the color balance.

Both the selective visible light absorbing colorant and the near-infrared absorbing colorant may be used as ionic compound colorants. If desired, these colorants may be replaced with other colorants. As the selective visible light absorbing colorant, a tetraazaporphyrin colorant can be added. As the near-infrared absorbing colorant, a phthalocyanine colorant can be added.

In one embodiment, a conductive layer formed of a metal or metal oxide may be employed as an electromagnetic wave shielding material of a front filter. In this case, since the conductive layer also acts to absorb near-infrared rays, the composition only needs to contain an ionic compound of a cyanine colorant having a maximum absorbance at 580 to 600 nm and a metal complex, and a transmittance-controlling colorant. That is, the composition need not contain a near-infrared absorbing colorant. If the near-infrared absorption function of the conductive layer is not satisfactory, however, a near-infrared absorbing colorant may also be added.

The film composition also includes an adhesive. Examples of the adhesive includes, but are not limited to, an acrylic resin including at least one constituent monomer selected from alkyl acrylates, such as methyl acrylate, ethyl acrylate, butyl acrylate and 2-ethyl hexyl acrylate. The adhesive may be used in an amount of 5 to 40% by weight, based on the total weight of the composition.

In addition to the above-mentioned components, a copolymerizable monomer can be further added. The copolymerizable monomer is selected from methacrylates containing a carboxylic acid, such as acrylic acid, maleic acid, methacrylic acid, itaconic acid or crotonic acid, methacrylates containing a hydroxyl group, such as hydroxy methyl methacrylate, alkyl methacrylates, such as butyl methacrylate and isopropyl methacrylate, and polymerizable vinyl monomers, such as vinyl acetate and vinyl propionate. In one embodiment, the copolymerizable monomer is used in an amount of 0.5~20% by weight with respect to the total weight of the film composition. In certain embodiments, the adhesive resin has a molecular weight of 50,000 to 2,000,000 and a glass transition temperature of 0° C. or below.

In another embodiment, the film composition may further include an isocyanate cross-linking agent, such as hexamethylene diisocyanate or toluene diisocyanate, an epoxy cross-linking agent, such as ethylene glycol diglycidyl ether or propylene glycol diglycidyl ether, or a melamine crosslinking agent, such as butoxy melamine. The crosslinking agent functions to increase the elasticity of the resulting film. If the elasticity of the adhesive layer is low when adding the colorant, collapsing of the adhesive layer may lead to an imbalance in color tone. In one embodiment, the crosslinking agent is used in an amount of 0.1 to 5% by weight, based on the weight of the adhesive resin.

In another embodiment, a silicone adhesive may be used. An addition reaction type silicone adhesive tends to cause little decomposition of the cyanine colorant. Accordingly, when the addition reaction type silicone adhesive is mixed with the ionic compound of the cyanine and the dithiol-metal complex, decomposition of the ionic compound can be minimized. The adhesive consists of an organopolysiloxane having an alkenyl group and an organohydrogen polysiloxane having a SiH group. An addition reaction takes place between the adhesive and a catalyst, such as a platinum compound to cure the adhesive. The adherent properties of the adhesive can be controlled by varying the mixing ratio between the organopolysiloxane having an alkenyl group and the organohydrogen polysiloxane having a SiH group.

Organic solvents that can be used for the preparation of the adhesive include ketone compounds, such as methyl ethyl ketone (MEK), acetone, cyclohexanone and cyclopentanone, ether compounds, such as dioxolane, dioxane and dimethoxyethane, aromatic compounds, such as toluene and xylene, and the like. In one embodiment, the total solid content is in an amount between 10 and 40% by weight with reference to the total weight of the composition.

In one embodiment, the film composition is coated on a silicone-treated heavy delamination release film by closed edge die coating, reverse roll coating, or bar coating. Then, a light delamination release film is laminated on the coated surface to produce an adhesive film. The adhesive film can be used as an adhesive layer of an antireflective film or an electromagnetic wave shielding copper mesh film.

Further, immediately after the film composition is coated on a heavy delamination release film, the coated release film is laminated on the back surface of an antireflective film or an electromagnetic wave shielding mesh film to produce a composite film having near-infrared blocking and color compensation functions. Thereafter the heavy delamination release film is removed from the composite film, and then the resulting film can be attached to a tempered glass to manufacture a front filter for a PDP or can be directly attached to a display panel.

The invention will now be described in more detail with reference to the following examples and comparative examples. However, these examples serve to illustrate the certain embodiments of the present invention, and they are not to be construed as limiting the scope of the invention.

EXAMPLE 1

Preparation of Ionic Compound of Cyanine and Dithiol-Metal Complex (1)

1.0 g of a near-infrared absorbing cyanine colorant (PDC-400MC(S), Nippon Kayaku), which has a maximum absorbance around 830 nm, having hexafluoroantimonate anion ($SbF_6^-$) and 1.0 g of a dithiol-copper complex (EST-5, Formula 8, Sumitomo Seika) having tetrabutylammonium cation were dissolved in 20 ml of dimethylformamide. After the solution was heated to 60° C., 150 ml of water was slowly added for one hour to precipitate an ionic compound of the cyanine and the dithiol-metal complex. The precipitate was filtered, and washed with water to remove tetrabutylammonium hexafluoroantimonate. The obtained solid was recrystallized from acetonitrile to obtain 1.2 g of the ionic compound. The absorption wavelength of the ionic compound was measured using a spectrophotometer (Lambda 950, Perkin-Elmer). Results of the analysis indicate that the ionic compound had the same maximum absorbance in the near-infrared region as that of the cyanine colorant PDC-400MC(S).

EXAMPLE 2

Preparation of Ionic Compound of Cyanine and Dithiol-Metal Complex (2)

1.0 g of a dithiol-nickel complex (NKX-1199, Hayashibara biochemical) and 0.33 g of p-phenylenediamine (Sigma Aldrich) were dissolved in 10 ml of dimethylsulfoxide. After the solution was stirred for 10 minutes, it was poured into 20 ml of a solution of 0.59 g of n-tetrabutylammonium bromide in ethanol. The resulting mixture was stirred for 10 minutes. All the solvents were removed under reduced pressure, and the residue was extracted with 10 ml of ethylacetate. The extract was mixed with 20 ml of distilled water with vigorous stirring. The obtained ethylacetate layer was evaporated under reduced pressure to remove the solvent, giving 1.3 g of an ionic compound in which a reduction product of the NKX-1199 was bonded to the n-tetrabutylammonium (see, Reaction 3).

1.0 g of the dithiol-nickel complex compound and 1 g of a near-infrared absorbing cyanine colorant (NK-5706, Hayashibara biochemical) having a maximum absorbance around 850 nm were dissolved in 20 ml of dimethylformamide. After the solution was heated to 60° C., 150 ml of water was slowly added and filtered to obtain a solid. The solid was recrystallized from acetonitrile to obtain 1.2 g of an ionic compound. The maximum absorption wavelength of the ionic compound was measured using a spectrophotometer (Lambda 950, Perkin-Elmer). Results of the analysis indicate that the ionic compound had the same maximum absorption wavelength as that of the cyanine colorant NK-5706.

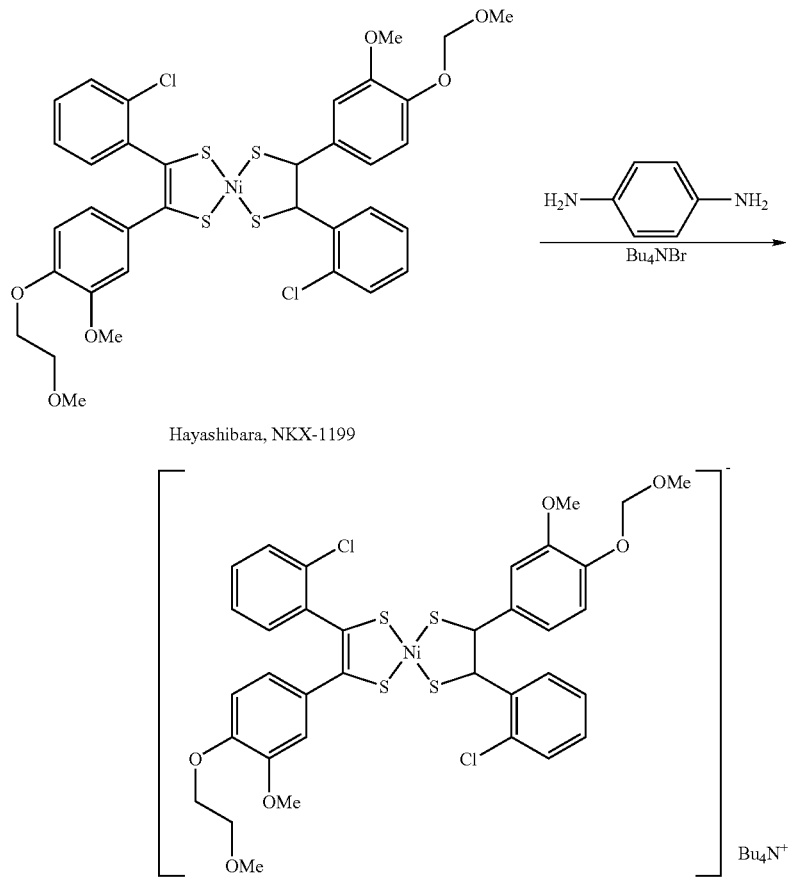

EXAMPLE 3

Preparation of Ionic Compound of Cyanine and Dithiol-Metal Complex (3)

1.0 g of a cyanine colorant (TY-102, Asahi Denka) having a maximum absorbance around 585 nm and 0.9 g of a dithiol-copper complex (EST-5, Sumitomo Seika) were dissolved in 20 ml of dimethylformamide. The solution was stirred at 60° C. for one hour. 150 ml of water was slowly added to the solution for 30 minutes and filtered to obtain a solid. The solid was recrystallized from acetonitrile to obtain 1.3 g of an ionic compound. The maximum absorption wavelength of the ionic compound was measured using a spectrophotometer (Lambda 950, Perkin-Elmer). Results of the analysis indicate that the ionic compound had the same maximum absorption wavelength as that of the cyanine colorant TY-102.

EXAMPLE 4

Preparation of Ionic Compound of Cyanine and Azo-Metal Complex (1)

1.2 g of an azo-metal complex (Lumaplast Black-KB, M-Dohmen) and 0.5 g of triethylamine were added to 20 ml of dimethylformamide, and then 1.0 g of a cyanine colorant (TY-102, Asahi Denka) having a maximum absorbance around 585 nm was added thereto. After the resulting mixture was stirred at 60° C. for one hour, 150 ml of distilled water was slowly added for 30 minutes and filtered to obtain a solid. The solid was recrystallized from acetonitrile to give 1.4 g of an ionic compound.

The maximum absorption wavelength of the ionic compound was measured using a spectrophotometer (Lambda 950, Perkin-Elmer). Results of the analysis indicate that the ionic compound had the same maximum absorption wavelength as that of the cyanine colorant TY-102.

EXAMPLE 5

Preparation of Ionic Compound of Diimmonium and Azo-Metal Complex (2)

1.5 g of an azo-metal complex (Lumaplast Black-KB, M-Dohmen) and 0.7 g of triethylamine were added to 20 ml of acetonitrile, and then 1 g of a diimmonium colorant (PDC-220, Nippon Kayaku) was added thereto. The mixture was stirred at 60° C. for one hour. The resulting mixture was evaporated under reduced pressure to reduce the volume of the solvent to 5 ml, and poured into 30 ml of toluene to precipitate a solid. The solid was filtered off, and the filtrate was evaporated to dryness, giving 1.2 g of an ionic compound of the diimmonium and the azo-metal complex. The maximum absorption wavelength of the ionic compound was measured using a spectrophotometer (Lambda 950, Perkin-Elmer). Results of the analysis indicate that the ionic compound had the same maximum absorption wavelength as that of the colorant PDC-220.

EXAMPLE 6

Production of Adhesive Film Containing Ionic Compound of Cyanine and Dithiol-Metal Complex 0.05% by weight of the ionic compound prepared in Example 1 and 10 g of a silicone adhesive (SD4570, Dow Coming) were mixed with 10 ml of methyl ethyl ketone. After the mixture was stirred for 30 minutes, 0.1 g of a curing agent (SRX212, Dow Coming) was added thereto. The mixture was stirred for 10 minutes. The mixture was coated on a 100 em-thick PET film (A4100, Toyobo) by bar coating and dried at 100° C. for 2 minutes. A fluorine-based release film (SS-4, Nippa) was laminated on the coated surface of the PET film to produce an adhesive coating optical film.

EXAMPLE 7

Production of Integral Film having Antireflective Function, Near-Infrared Absorption Function and Color Compensation Function (1)

0.1% by weight of the ionic compound prepared in Example 2, 0.02% by weight of the ionic compound prepared in Example 3, 0.6% by weight of the ionic compound prepared in Example 5, and 10 g of an acrylate copolymeric adhesive SK Dyne-1435, Soken) were mixed with 5 ml of methyl ethyl ketone. After the mixture was stirred for 30 minutes, 0.02 g of a diisocyanate curing agent (L-45, Soken) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function, near-infrared absorption function and color compensation function.

EXAMPLE 8

Production of Integral Film having Antireflective Function, Near-Infrared Absorption Function and Color Compensation Function (2)

0.1% by weight of the ionic compound prepared in Example 2, 0.02% by weight of the ionic compound prepared in Example 3, 0.6% by weight of the ionic compound prepared in Example 5, and 10 g of a silicone adhesive (SD4570, Dow Coming) were mixed with 10 ml of methyl ethyl ketone. After the mixture was stirred for 30 minutes, 0.1 g of a curing agent (SRX212, Dow Coming) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function, near-infrared absorption function and color compensation function.

EXAMPLE 9

Production of Integral Film having Antireflective Function and Color Compensation Function (1)

0.02% by weight of the ionic compound prepared in Example 3 and 10 g of an acrylate copolymeric adhesive SK Dyne-1435, Soken were mixed with 5 ml of methyl ethyl ketone. After the mixture was stirred for 30 minutes, 0.02 g of a diisocyanate curing agent (L-45, Soken) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function and color compensation function.

EXAMPLE 10

Production of Integral Film having Antireflective Function and Color Compensation Function (2)

0.02% by weight of the ionic compound prepared in Example 3 and 10 g of a silicone adhesive (SD4570, Dow Corning) were mixed with 10 ml of methyl ethyl ketone. After the mixture was stirred for 30 minutes, 0.1 g of a curing agent (SRX212, Dow Corning) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function and color compensation function.

EXAMPLE 11

Production of Adhesive Film Containing Cyanine Colorant (1)

0.05% by weight of a cyanine colorant (PDC-400MC(S), Nippon Kayaku) and 10 g of a silicone adhesive (SD4570, Dow Corning) were mixed with 10 ml of methyl ethyl ketone. After the mixture was stirred for 30 minutes, 0.1 g of a curing agent (SRX212, Dow Corning) was added thereto. The resulting mixture was stirred for 10 minutes. The mixture was coated on a 100 μm-thick PET film (A4100, Toyobo) by bar coating and dried at 100° C. for 2 minutes. A fluorine-based release film (SS-4, Nippa) was laminated on the coated surface of the PET film to produce an adhesive coating optical film.

EXAMPLE 12

Production of Integral Film having Antireflective Function, Near-Infrared Absorption Function and Color Compensation Function (1)

0.1% by weight of a cyanine colorant (NK-5706, Hayashibara biochemical), 0.02% by weight of a cyanine colorant (TY-102, Asahi Denka Denka), a diimmonium colorant (PDC-220, Nippon Kayaku), and 10 g of an acrylate copolymeric adhesive SK Dyne-1435, Soken were mixed with 5 ml of methyl ethyl ketone. After the mixture was stirred for 30 minutes, 0.02 g of a diisocyanate curing agent (L-45, Soken) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function, near-infrared absorption function and color compensation function.

EXAMPLE 13

Production of Integral Film having Antireflective Function, Near-Infrared Absorption Function and Color Compensation Function (2)

0.1% by weight of a cyanine colorant (NK-5706, Hayashibara biochemical), 0.02% by weight of a cyanine colorant (TY-102, Asahi Denka Denka), a diimmonium colorant (PDC-220, Nippon Kayaku), and 10 g of a silicone adhesive (SD4570, Dow Corning) were mixed with 10 ml of methyl ethyl ketone. After the mixture was stirred for 30 minutes, 0.1 g of a curing agent (SRX212, Dow Corning) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function, near-infrared absorption function and color compensation function.

EXAMPLE 14

Production of Integral Film having Antireflective Function and Color Compensation Function (1)

0.02% by weight of a cyanine colorant (TY-102, Asahi Denka Denka) and 10 g of an acrylate copolymeric adhesive (SK Dyne-1435, Soken) were mixed with 5 ml of methyl ethyl ketone. After the mixture was stirred for 30 minutes, 0.02 g of a diisocyanate curing agent (L-45, Soken) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function and color compensation function.

EXAMPLE 15

Production of Integral Film having Antireflective Function and Color Compensation Function (2)

0.02% by weight of a cyanine colorant (TY-102, Asahi) and 10 g of a silicone adhesive (SD4570, Dow Corning) were mixed with 10 ml of methyl ethyl ketone. After the mixture was stirred for 30 minutes, 0.1 g of a curing agent (SRX212, Dow Corning) was added thereto. The resulting mixture was stirred for 10 minutes. The mixture was coated on a release film (PET-75X1-V4, Nippa) by bar coating and dried at 100° C. for 2 minutes. The coated release film was laminated on a non-coated back surface of an antireflective film treated with hard coating, high-refractive index coating, low-refractive index coating to produce an integral film having antireflective function and color compensation function.

EXAMPLE 16

Measurement of Transmittance

The release films were removed from the films produced in Examples 6 to 15. Each of the resulting films was laminated on a 3 mm-thick soda lime glass plate, and the transmittance of the films was measured at specific wavelengths using a spectrophotometer (Lambda 950, Perkin-Elmer). The results are shown in Table 1.

TABLE 1

|  | Transmittance (%) | | |
| --- | --- | --- | --- |
|  | 585 nm | 830 nm | 950 nm |
| Example 6 | — | 12 | — |
| Example 7 | 40 | 15 | 8 |
| Example 8 | 33 | 10 | 5 |
| Example 9 | 41 | | |
| Example 10 | 34 | | |
| Example 11 | — | 37 | — |
| Example 12 | 71 | — | 72 |
| Example 13 | 55 | — | 63 |
| Example 14 | 70 | | 73 |
| Example 15 | 55 | | 62 |

The transmittance values of the films produced in Examples 6 to 10 were compared with those of the films produced in Examples 11 to 15, respectively. Decomposition of the colorants arising from the use of the adhesives was decreased when the colorants were combined with the metal complex anions to form the ionic compounds, compared to when the cyanine colorant or diimmonium colorant was used individually.

As apparent from the above description, according to the present invention, cyanine colorants absorbing visible light at particular wavelengths, near-infrared absorbing cyanine colorants and near-infrared absorbing diimmonium colorants can be successfully mixed with adhesives. When the colorant mixtures are used as adhesives of antireflective films, the number of films necessary to produce front filters for PDPs can be reduced. Therefore, the present invention is advantageous in that the amounts of raw materials are reduced and production procedures are shortened.

Although the embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A composition for a filter layer of a display device, the composition comprising:

a first ionic compound including a first anion and a first cation that are ionically bonded to one another;

a second ionic compound including a second cation and a second anion that are ionically bonded to one another; and an adhesive, wherein:

a cross-linking agent;

the first anion is metal complex represented by Formula 5 or 6:

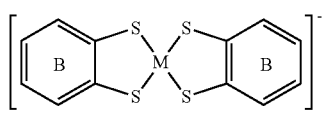

Formula 5

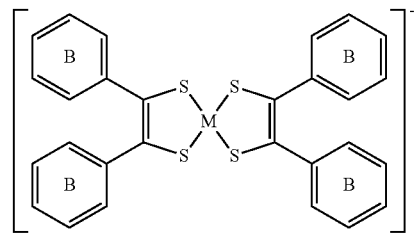

Formula 6 in Formulae 5 and 6, each B is independently a substituted or unsubstituted benzene ring and M is a metal atom selected from the group consisting of Pd, Ni, Co and Cu, the first cation is a cyanine having an absorption maximum in the range of 820 nm to 1,100 nm, the second cation is a cyanine cation having an absorption maximum in the range of 580 nm to 600 nm, and the second anion is an azo-metal complex.

2. The composition of claim 1, wherein:

the cyanine cation has an absorption maximum in the range of 820 nm to 950 nm, and the cation comprises a cyanine cation represented by Formula 1:

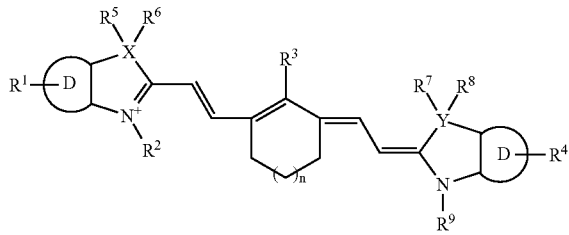

Formula 1 wherein each of $R^1$ and $R^4$ is independently hydrogen, halogen, nitro, cyano, $C_1$-$C_{16}$ alkoxy, $C_1$-$C_{16}$ alkyl, $C_1$-$C_{16}$ alkylalkoxy, or amino;

wherein each of $R^2$ and $R^9$ is independently hydrogen, $C_1$-$C_{16}$ alkyl, $C_1$-$C_{16}$ alkylalkoxy, or $C_1$-$C_{16}$ alkylsulfonic acid;

wherein $R^3$ is hydrogen, halogen, substituted phenyl, $C_1$-$C_{16}$ alkyl, or amino;

wherein each D is independently a benzene or naphthalene ring;

wherein each of X and Y is independently C, N, S or Se, provided that when both X and Y are C, each of $R^5$ and $R^6$ is independently hydrogen or $C_1$-$C_{16}$ alkyl, or $R^5$ and $R^6$ are bonded together to form an alkyl ring, and each of $R^7$ and $R^8$ is independently hydrogen or $C_1$-$C_{16}$ alkyl, or $R^7$ and $R^8$ are bonded together to form an alkyl ring, provided that when both X and Y are N, each of $R^5$ and $R^7$ is independently hydrogen or $C_1$-$C_{16}$ alkyl, and $R^6$ and $R^8$ represent no atom, and provided that when X and Y are S or Se, $R^5$, $R^6$, $R^7$ and $R^8$ represent no atom; and wherein n is an integer between 0 and 2.

3. The composition of claim 1, wherein, in the second ionic compound, the second cation is represented by Formula 4:

Formula 4

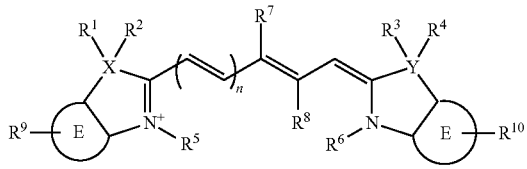

wherein each of $R^9$ and $R^{10}$ is independently hydrogen, halogen, nitro, cyano, $C_1$-$C_{16}$ alkoxy, $C_1$-$C_{16}$ alkyl, $C_1$-$C_{16}$ alkylalkoxy, or amino;

wherein each of $R^5$ and $R^6$ is independently hydrogen, $C_1$-$C_{16}$ alkyl, $C_1$-$C_{16}$ alkylalkoxy, or $C_1$-$C_{16}$ alkylsulfonic acid; and wherein n is 0 or 1; provided that when n is 0, $R^7$ is hydrogen and $R^8$ is hydrogen, halogen, substituted phenyl, $C_1$-$C_{16}$ alkyl, or amino, provided that when n is 1, $R^7$ is hydrogen or halogen, substituted phenyl, $C_1$-$C_{16}$ alkyl or amino and $R^8$ is hydrogen;

wherein each E is independently a benzene or naphthalene ring; and wherein each of X and Y is independently C, N, S or Se, provided that when both X and Y are C, each of $R^1$ and $R^2$ is independently hydrogen or $C_1$-$C_{16}$ alkyl, or $R^1$ and $R^2$ are bonded together to form an alkyl ring, and each of $R^3$ and $R^4$ is independently hydrogen or $C_1$-$C_{16}$ alkyl, or $R^3$ and $R^4$ are bonded together to form an alkyl ring, provided that when both X and Y are N, each of $R^1$ and $R^3$ is independently hydrogen or $C_1$-$C_{16}$ alkyl, and R2 and $R^4$ represent no atom, and provided that when X and Y are S or Se, $R^1$, $R^2$, $R^3$ and $R^4$ represent no atom.

4. A film comprising the composition of claim 1.

5. A method of making an electronic device, comprising:
providing a display device for emitting visible light of an image; and
placing the film of claim 4 in relation to the display device such that at least part of the visible light passes through the film.

6. The composition of claim 1, wherein:
in Formulae 5 and 6, at least one B is substituted with a substituent group selected from the group consisting of halogen, $C_1$-$C_{16}$ alkyl, $C_1$-$C_{16}$ alkoxy, $C_1$-$C_{16}$ alkylalkoxy, cyano, $C_1$-$C_{16}$ alkylsulfide, substituted sulfonyl, amino, nitro, and ester.

7. The composition as claimed in claim 1, wherein the cross-linking agent includes an isocyanate cross-linking agent, an epoxy cross-linking agent, or a melamine cross-linking agent.

* * * * *